(12) United States Patent
Sasai

(10) Patent No.: US 12,744,594 B2

(45) Date of Patent: Sep. 22, 2026

(54) NETWORK CONTROLLER, ESTIMATION METHOD AND COMPUTER PROGRAM

(71) Applicant: NTT, Inc., Tokyo (JP)

(72) Inventor: Takeo Sasai, Musashino (JP)

(73) Assignee: NTT, Inc., Tokyo (JP)

( * ) Notice: Subject to any disclaimer, the term of this patent is extended or adjusted under 35 U.S.C. 154(b) by 354 days.

(21) Appl. No.: 18/687,375

(22) PCT Filed: Sep. 8, 2021

(86) PCT No.: PCT/JP2021/033039

§ 371 (c)(1),
(2) Date: Feb. 28, 2024

(87) PCT Pub. No.: WO2023/037454

PCT Pub. Date: Mar. 16, 2023

(65) Prior Publication Data

US 2025/0125871 A1 Apr. 17, 2025

(51) Int. Cl.
*H04B 10/079* (2013.01)
*H04B 10/073* (2013.01)

(52) U.S. Cl.
CPC ....... *H04B 10/0731* (2013.01); *H04B 10/079* (2013.01); *H04B 10/0793* (2013.01); *H04B 10/0795* (2013.01)

(58) Field of Classification Search
CPC ........ H04B 10/07–0799; H04B 10/079; H04B 10/0793; H04B 10/0795

(Continued)

(56) References Cited

U.S. PATENT DOCUMENTS 6,023,366 A 2/2000 Kinoshita
2002/0039226 A1* 4/2002 Murakami ........ H04J 14/02212 359/337

(Continued)

FOREIGN PATENT DOCUMENTS

JP 05292033 11/1993
JP H05292033 A * 11/1993

(Continued)

OTHER PUBLICATIONS

[No Author Listed], "Multispan optical transmission line monitoring technology by learning nonlinear Schrödinger equation," Business Communication, 2021, 58(6):22-25.

(Continued)

*Primary Examiner* — Li Liu

(74) *Attorney, Agent, or Firm* — Fish & Richardson P.C.

(57) ABSTRACT

A network controller included in an optical transmission system in which an optical transmitter and an optical receiver communicate with each other via an optical transmission path, the network controller including a simulator that constructs simulation models by virtually reproducing a state of an optical transmission path in an optical transmission system including the optical transmitter, the optical receiver, and the optical transmission path in different virtual spaces, and estimates a characteristic of a device provided in the optical transmission path in each of simulation models, and an ideal output estimator that estimates an output of a characteristic of an ideal device based on a characteristic of the device estimated by the simulator and a characteristic of a device provided in the optical transmission path obtained in a real space, in which a state of an optical transmission path is different for each of the simulation models.

4 Claims, 9 Drawing Sheets

(58) Field of Classification Search
USPC ........................................................ 398/9–38
See application file for complete search history.

(56) References Cited

U.S. PATENT DOCUMENTS

| | | | |
|---|---|---|---|
| 2012/0121259 A1 | 5/2012 | Kuwata et al. | |
| 2019/0074903 A1 | 3/2019 | Takamuku et al. | |
| 2021/0328666 A1* | 10/2021 | Yamagishi ......... | H04B 10/6162 |
| 2022/0416890 A1 | 12/2022 | Sasai et al. | |
| 2023/0106338 A1 | 4/2023 | Sasai et al. | |

FOREIGN PATENT DOCUMENTS

| | | | |
|---|---|---|---|
| JP | 09321701 | 12/1997 | |
| JP | 2010278562 A * | 12/2010 | |
| JP | 2014195149 | 10/2014 | |
| JP | 2014195149 A * | 10/2014 | |
| WO | WO 2017217217 | 12/2017 | |
| WO | WO-2019049616 A1 * | 3/2019 | ............. H04L 27/34 |
| WO | WO-2020175026 A1 * | 9/2020 | ......... H04B 10/6162 |
| WO | WO 2021124415 | 6/2021 | |
| WO | WO 2021199317 | 10/2021 | |

OTHER PUBLICATIONS

International Search Report and Written Opinion in International Appln. No. PCT/JP2022/002185, mailed on Apr. 12, 2022, 4 pages.
Marcuse et al., “Application of the Manakov-PMD Equation to Studies of Signal Propagation in Optical Fibers with Randomly Varying Birefringence,” Journal of Lightwave Technology, Sep. 1997, 15(9):1735-1746.
Sasai et al., “Digital Longitudinal Monitoring of Optical Fiber Communication Link,” Journal of Lightwave Technology, Dec. 2021, 40(8):2390-2408.
Sasai et al.,“Digital Backpropagation for Optical Path Monitoring-Loss and Dispersion Profile Estimation-,” IEICE Technical Report, Jan. 2021, 120(309):61-64 (with English abstract).
Tanimura et al., “Fiber-Longitudinal Anomaly Position Identification Over Multi-Span Transmission Link Out of Receiver-end Signals,” J. Lightw. Technol., May 2020, 38(9):2726-2733.
Asif et al., “Optimized digital backward propagation for phase modulated signals in mixed-optical fiber transmission links,” Optics Express, Oct. 2010, 18(22):22796, 12 pages.
Ip et al., “Compensation of Dispersion and Nonlinear Impairments Using Digital Back propagation,” Journal of Lightwave Technology, Oct. 2008, 26(20):3416-3425.
Barnoski et al., “Fiber waveguides: a novel technique for investigating attenuation characteristics,” Applied Optics, Sep. 1976, 15(9):2112-2115.
Furukawa et al., “Enhanced Coherent OTDR for Long Span Optical Transmission Lines Containing Optical Fiber Amplifiers,” IEEE Photonics Technology Letters, May 1995, 7(5):540-542.
Matsushita et al., “High-Spectral-Efficiency 600-Gbps/Carrier Transmission Using PDM-256QAM Format,” Journal of Lightwave Technology, Jan. 2019, 37(2):470-476.
Sasai et al., “Digital Backpropagation for Optical Path Monitoring: Loss Profile and Passband Narrowing Estimation,” 2020 European Conference on Optical Communications (ECOC), Brussels, Belgium, Dec. 6-10, 2020, 4 pages.
Sasai et al., “Physics-oriented learning of nonlinear Schrödinger equation: optical fiber loss and dispersion profile identification,” CoRR, submitted on Apr. 2021, arXiv:2104.05890, 26 pages.
Sasai et al., “Revealing Raman-amplified Power Profile and Raman Gain Spectra with Digital Backpropagation,” 2021 Optical Fiber Communications Conference and Exhibition (OFC), San Francisco, CA, USA, Jun. 6-10, 2021, 3 pages.
Sasai et al., “Simultaneous Detection of Anomaly Points and Fiber types in Multi-span Transmission Links Only by Receiver-side Digital Signal Processing,” 2020 Optical Fiber Communications Conference and Exhibition (OFC), San Diego, CA, USA, Mar. 8-12, 2020, 3 pages.
Tanimura et al., “Experimental Demonstration of a Coherent Receiver that Visualizes Longitudinal Signal Power Profile over Multiple Spans out of Its Incoming Signal,” 45th European Conference on Optical Communication (ECOC 2019), Dublin, Ireland, Sep. 22-26, 2019, 4 pages.

* cited by examiner

NETWORK CONTROLLER, ESTIMATION METHOD AND COMPUTER PROGRAM

CROSS-REFERENCE TO RELATED APPLICATIONS

This application is a National Stage application under 35 U.S.C. § 371 of International Application No. PCT/JP2021/033039, having an International Filing Date of Sep. 8, 2021. The disclosure of the prior application is considered part of the disclosure of this application, and is incorporated by reference in its entirety into this application.

TECHNICAL FIELD

The present invention relates to a network controller, an estimation method, and a computer program.

BACKGROUND ART

Various devices including an optical fiber, an optical amplifier, an optical filter, and the like are incorporated in an optical transmission system. Conventionally, these device characteristics have been measured by an analog measuring instrument such as an optical time domain reflectometer (OTDR) or an optical spectrum analyzer. However, measurement using an analog measuring instrument requires a measuring instrument for each optical node and optical fiber, which increases equipment cost and operation cost.

Therefore, in recent years, a technology for extracting characteristics of various devices in an optical transmission system by digital signal processing on a reception side instead of measurement by an analog measuring instrument has been proposed (see, for example, Non Patent Literature 1 to 4). In the technology described in Non Patent Literature 1 to 4, responses of various devices in a transmission system can be estimated only by digital signal processing on a reception signal of the optical transmission system. For example, in the technology described in Non Patent Literature 1 to 4, optical fiber loss or dispersion distribution, an optical amplifier gain spectrum, an optical filter response, and the like can be estimated.

CITATION LIST

Non Patent Literature

Non Patent Literature 1: T. Sasai, et al., "Simultaneous detection of anomaly points and fiber types in multi-span transmission links only by receiver-side digital signal processing", in OFC2020, Paper Th1F.1.

Non Patent Literature 2: T. Sasai, et al., "Physics-oriented learning of nonlinear Schrodinger equation: optical fiber loss and dispersion profile identification", arXiv: 2104.05890.

Non Patent Literature 3: T. Sasai, et al., "Digital back-propagation for optical path monitoring: loss profile and passband narrowing estimation", ECOC2020, Paper Tu2D.1.

Non Patent Literature 4: T. Sasai, et al., "Revealing Raman-amplified power profile and Raman gain spectra with digital backpropagation", in OFC2021, Paper M31.5.

SUMMARY OF INVENTION

Technical Problem

However, the technology described in Non Patent Literature 1 to 4 has an issue that, although measurement can be performed more easily than an analog measuring instrument, estimation accuracy and resolution of a characteristic of a device are poor.

In view of the above circumstances, an object of the present invention is to provide a technology capable of estimating a characteristic of a device included in an optical transmission system with high accuracy.

Solution to Problem

One aspect of the present invention is a network controller included in an optical transmission system in which an optical transmitter and an optical receiver communicate with each other via an optical transmission path, the network controller including a simulation unit that constructs a plurality of simulation models by virtually reproducing a state of an optical transmission path in an optical transmission system including the optical transmitter, the optical receiver, and the optical transmission path in different virtual spaces, and estimates a characteristic of a device provided in the optical transmission path in each of simulation models, and an ideal output estimation unit that estimates an output of a characteristic of an ideal device on the basis of a characteristic of the device estimated by the simulation unit and a characteristic of a device provided in the optical transmission path obtained in a real space, in which a state of an optical transmission path in the optical transmission system is different for each of the simulation models.

One aspect of the present invention is an estimation method performed by a network controller included in an optical transmission system in which an optical transmitter and an optical receiver communicate with each other via an optical transmission path, the estimation method including constructing a plurality of simulation models by virtually reproducing a state of an optical transmission path in an optical transmission system including the optical transmitter, the optical receiver, and the optical transmission path in different virtual spaces, and estimating a characteristic of a device provided in the optical transmission path in each of simulation models, and estimating an output of a characteristic of an ideal device on the basis of an estimated characteristic of the device and a characteristic of a device provided in the optical transmission path obtained in a real space, in which a state of an optical transmission path in the optical transmission system is different for each of the simulation models.

One aspect of the present invention is a computer program for causing a computer to function as the network controller.

Advantageous Effects of Invention

According to the present invention, a characteristic of a device included in an optical transmission system can be estimated with high accuracy.

DESCRIPTION OF EMBODIMENTS

Hereinafter, embodiments of the present invention will be described with reference to drawings.

First Embodiment

Figure 1:
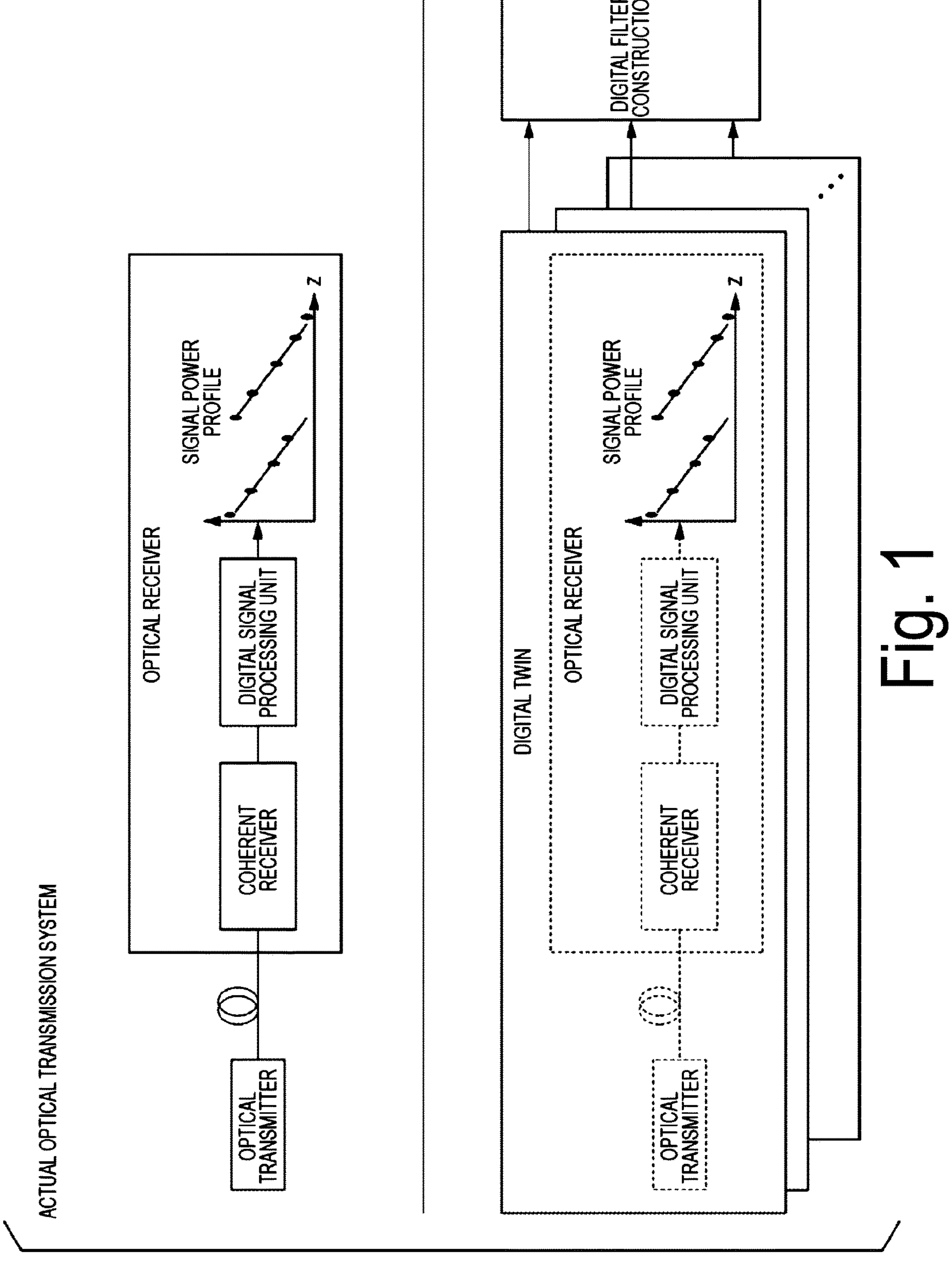
FIG. 1 is a diagram for describing an outline of an optical transmission system according to a first embodiment.

FIG. 1 is a diagram for describing an outline of an optical transmission system according to a first embodiment. In the first embodiment, a digital filter is used as a method for improving estimation accuracy of a characteristic of a device included in the optical transmission system. Note that, in the following description, loss distribution of an optical fiber will be described as an example of a characteristic of a device, but the same method can be applied to dispersion distribution of an optical fiber, an amplifier gain spectrum, and an optical filter response. In the following description, the technology described in Non Patent Literature 1 to 4 is referred to as digital longitudinal monitoring (DLM).

In order to improve estimation accuracy of a characteristic of a device, designing a digital filter that converts an output obtained by DLM (hereinafter referred to as a "DLM output") into an ideal output is conceivable. However, in order to form a filter that accurately outputs a characteristic of every transmission path device, every optical transmission path needs to be actually prepared and an enormous amount of data sets of transmission path device characteristics (sets of DLM outputs and ideal outputs) needs to be prepared, which is not realistic.

Therefore, in the first embodiment, simulation models of the optical transmission system (digital twins of optical transmission paths) are constructed as illustrated in the lower diagram of FIG. 1 in order to solve shortage of data sets for forming a digital filter. Note that an optical transmission path model has been extensively studied, and for example, a technology of Reference Literature 1 below can be used. As an optical filter model, any filter shape can be used according to the optical filter to be used, and for example, a Gaussian filter may be used.

(Reference Literature 1: E. Ip et al., "Compensation of Dispersion and Nonlinear Impairments Using Digital Backpropagation", J. Lightw. Technol., 26(20), 2008)

In the first embodiment, as in an actual optical transmission system, a state (loss amount, loss position, distribution amount, etc.) of every optical transmission path is virtually reproduced on digital twins, DLM outputs are obtained, and a plurality of data sets of the DLM outputs and ideal outputs is held. Here, an ideal output is loss distribution of an optical fiber or the like (in a case where the estimation target of DLM is dispersion distribution of an optical fiber, an amplifier gain spectrum, an optical filter response, or the like, the estimation target is the dispersion distribution of the optical fiber, the amplifier gain spectrum, the optical filter response, or the like) given by a user on a digital twin, and is a state of a transmission path that is the estimation target of DLM. Then, by a digital filter being constructed on the basis of the plurality of data sets held, the data set shortage is resolved. As a result, a digital filter that accurately outputs a characteristic of a device can be constructed. Hereinafter, a specific configuration will be described.

Figure 2:
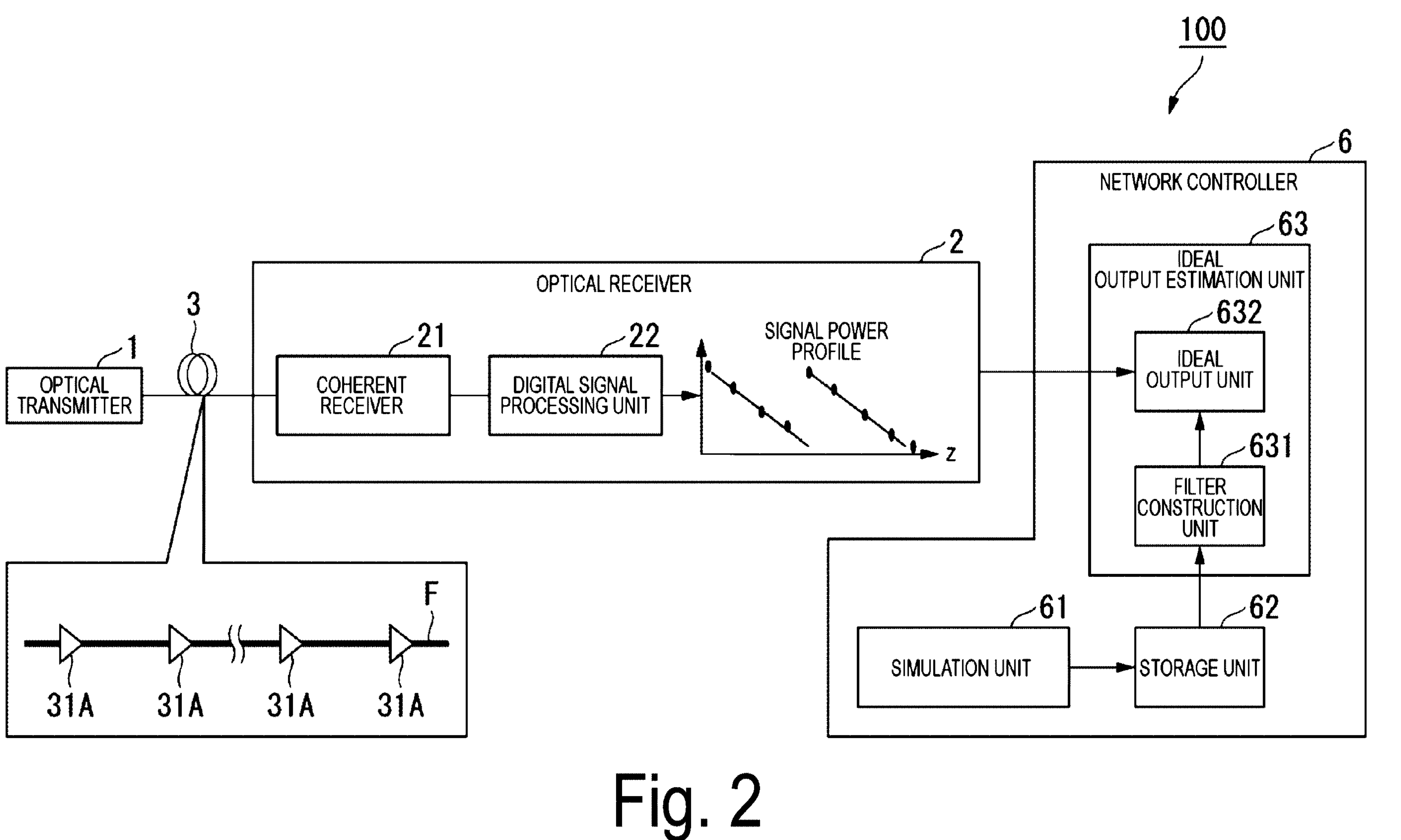
FIG. 2 is a diagram illustrating a configuration of the optical transmission system according to the first embodiment.

FIG. 2 is a diagram illustrating a configuration of an optical transmission system 100 according to the first embodiment. The optical transmission system 100 includes an optical transmitter 1, an optical receiver 2, an optical transmission path 3, and a network controller 6. The optical transmitter 1 and the optical receiver 2 are communicably connected via an optical transmission path 3. The optical transmission path 3 includes, for example, an optical fiber F. In the optical transmission path 3, one or more relay nodes 31A that amplify and relay an optical signal that attenuates during propagation are inserted in the middle of the transmission path as optical amplifier instruments (hereinafter also referred to as "optical amplifiers"). Note that an optical filter may be provided in the optical transmission path 3.

The optical transmitter 1 encodes transmission information provided from an external information source to generate an electrical signal, converts the generated electrical signal into an optical signal, and transmits the optical signal to the optical receiver 2 via the optical transmission path 3.

The optical receiver 2 includes a coherent receiver 21 and a digital signal processing unit (digital signal processor) 22. The coherent receiver 21 separates a baseband optical signal into two optical signals having polarization planes orthogonal to each other. These optical signals and a locally emitted light of a locally emitted light source (not illustrated) are input to a 90° hybrid circuit (not illustrated), and a total of four output lights of a set of output lights in which both lights interfere with each other in the same phase and the opposite phase and a set of output lights in which both lights interfere with each other orthogonally (90°) and inverse-orthogonally (−90°) are obtained. These output lights are converted into respective analog signals by a photodiode (not illustrated). The coherent receiver 21 converts these analog signals into digital signals.

When an optical signal propagates through the optical transmission path 3, a signal waveform is distorted by a non-linear optical effect in which a phase of the signal rotates in proportion to optical power of the signal. The digital signal processing unit 22 takes in the digital signals output from the coherent receiver 21 as reception signals, and performs non-linear optical compensation on the reception signals that have been taken in.

The digital signal processing unit 22 estimates a characteristic of a device in the optical transmission path 3 on the basis of the received optical signals and notifies the network controller 6 of the characteristic as a DLM output. For example, the digital signal processing unit 22 generates a signal power profile indicating intensity distribution of the optical signals in the propagation direction as a DLM output. The digital signal processing unit 22 supplies the generated DLM output to the network controller 6.

The network controller 6 constructs a plurality of simulation models including the optical transmitter 1, the optical receiver 2, and the optical transmission path 3 included in an optical transmission system in the real space. At this time, the network controller 6 constructs a plurality of simulation models by virtually reproducing a state (loss amount, loss position, distribution amount, etc.) of every optical transmission path in different virtual spaces. The network controller 6 estimates an ideal DLM output on the basis of a data set including virtual DLM outputs obtained by the respective constructed simulation models and ideal outputs corresponding to the virtual DLM outputs, and a DLM output obtained from the optical receiver 2.

Figure 3:
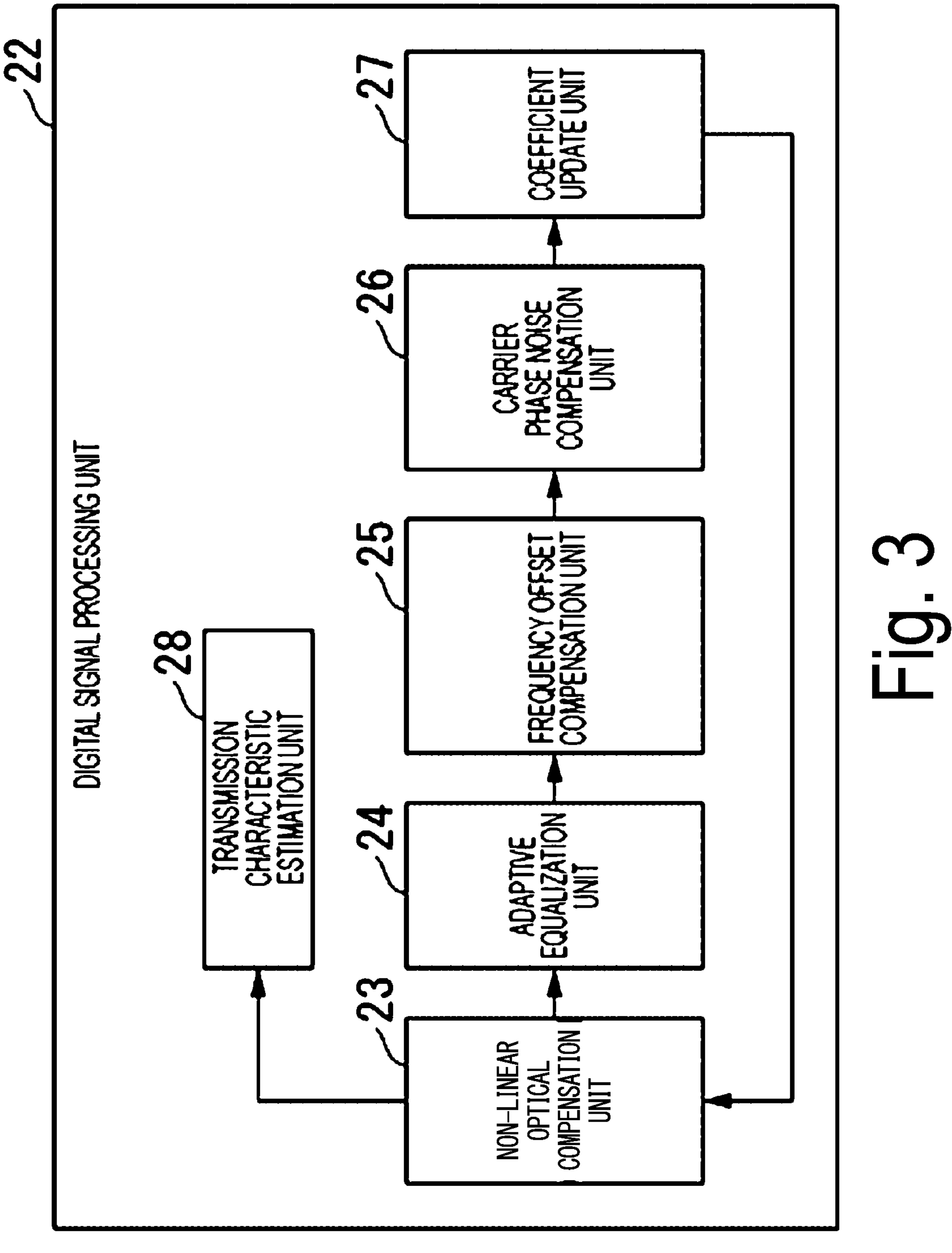
FIG. 3 is a diagram illustrating an example of a functional configuration of a digital signal processing unit according to the first embodiment.

FIG. 3 is a diagram illustrating an example of a functional configuration of the digital signal processing unit 22 according to the first embodiment. The digital signal processing unit 22 includes a non-linear optical compensation unit 23, an adaptive equalization unit 24, a frequency offset compensation unit 25, a carrier phase noise compensation unit 26, a coefficient update unit 27, and a transmission characteristic estimation unit 28.

Figure 4:
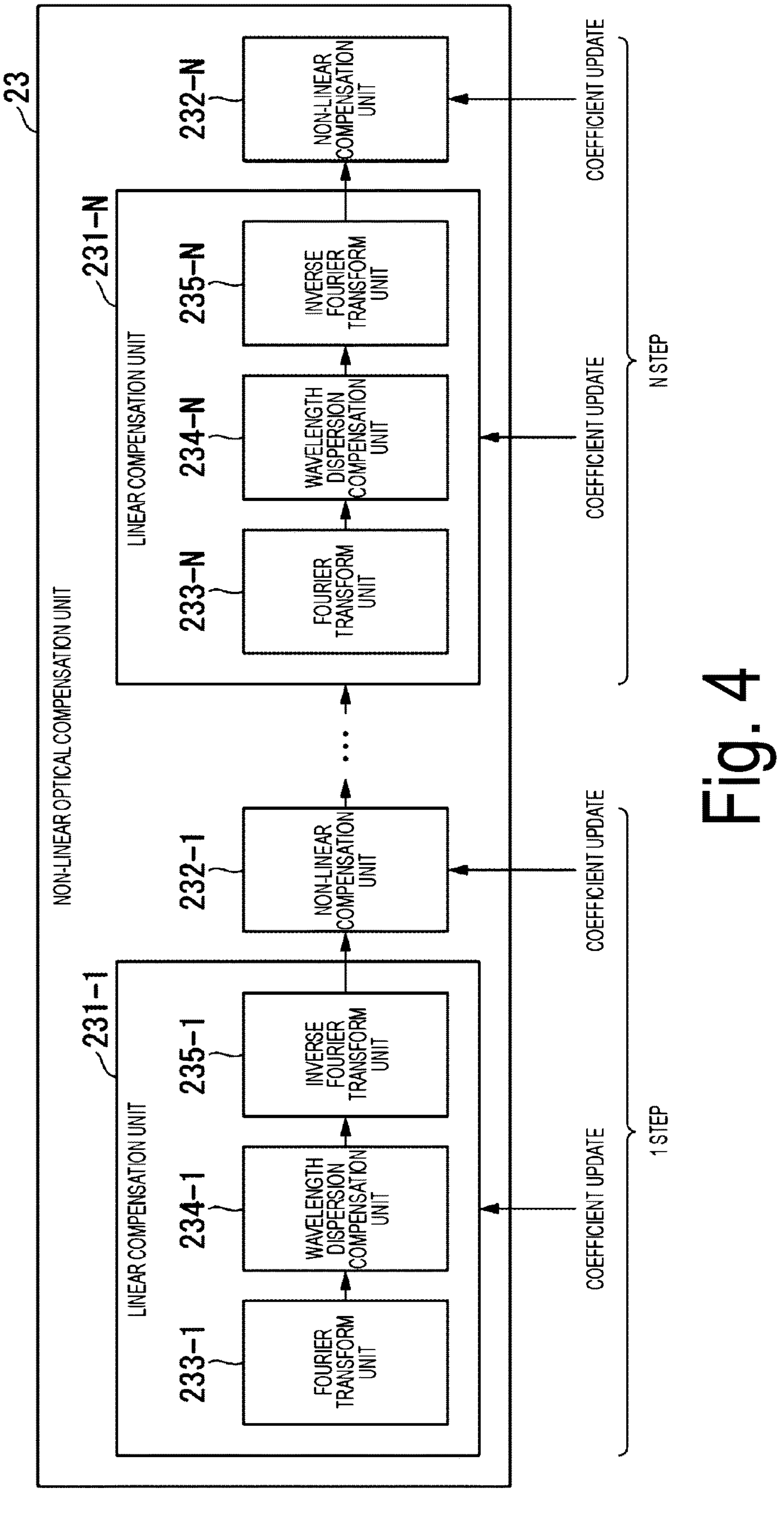
FIG. 4 is a schematic block diagram illustrating a functional configuration of a non-linear optical compensation unit according to the first embodiment.

FIG. 4 is a schematic block diagram illustrating a functional configuration of the non-linear optical compensation unit 23 according to the first embodiment. The non-linear optical compensation unit 23 includes a plurality of linear compensation units 231-1 to 231-N and a plurality of non-linear compensation units 232-1 to 232-N. One linear compensation unit 231 and one non-linear compensation unit 232 are one set that performs linear compensation and non-linear compensation, and the non-linear optical compensation unit 23 includes N sets in order to perform processing by this set in N steps.

The linear compensation unit 231-1 includes a Fourier transform unit 233-1, a wavelength dispersion compensation unit 234-1, and an inverse Fourier transform unit 235-1. The Fourier transform unit 233-1 transforms a reception signal in the time domain into a reception signal in the frequency domain by performing FFT on the reception signal in the time domain.

The wavelength dispersion compensation unit 234-1 performs wavelength dispersion compensation by multiplying a reception signal in the frequency domain by a predetermined value (for example, exp^$(-j*\beta_k\omega_2)$). Note that the symbol "^" means that a value after "^" is a superscript of exp. For example, in the case of exp^$(-j\beta_k\omega_2)$, it means that $(-j\beta_k\omega_2)$ is a superscript of exp. Regarding "^", the same applies to the following description. The wavelength dispersion compensation unit 234-1 performs wavelength dispersion compensation using a dispersion coefficient Ok set as an initial value at the start of processing, and performs wavelength dispersion compensation using an updated dispersion coefficient Ok each time the dispersion coefficient Ok is updated from the coefficient update unit 27.

The inverse Fourier transform unit 235-1 transforms a reception signal on which wavelength dispersion compensation has been performed into a reception signal in the time domain by performing IFFT on a signal output from the wavelength dispersion compensation unit 234-1.

The non-linear optical compensation unit 23 compensates for a non-linear optical effect by multiplying a signal sequence output from the inverse Fourier transform unit 235 by a predetermined value (for example, exp^$(-j\varphi_k)$). Specifically, the non-linear optical compensation unit 23 compensates for a non-linear optical effect using a phase rotation amount $\varphi_k$ set as an initial value at the start of processing, and compensates for a non-linear optical effect using an updated phase rotation amount $\varphi_k$ each time the phase rotation amount $\varphi_4$ is updated from the coefficient update unit 27.

The linear compensation unit 231-N performs processing similar to that of the linear compensation unit 231-1. Furthermore, the non-linear compensation unit 232-N performs processing similar to that of the non-linear compensation unit 232-1.

Returning to FIG. 3, the description of the optical receiver 2 will be continued. The adaptive equalization unit 24 is a functional unit that compensates for distortion generated in a waveform of an optical signal in the optical transmission path 3. That is, the adaptive equalization unit 24 is a functional unit that corrects a code error generated in an optical signal due to interference between codes (intersymbol interference) in the optical transmission path 3. The adaptive equalization unit 24 executes adaptive equalization processing using an FIR filter (finite impulse response filter) according to a set tap coefficient.

The frequency offset compensation unit 25 performs processing of compensating for a frequency offset on four digital signals on which the adaptive equalization processing has been performed.

The carrier phase noise compensation unit 26 performs processing of compensating for a phase offset on the four digital signals having frequency offsets that have been compensated for.

The coefficient update unit 27 updates all coefficients (for example, dispersion coefficient $\beta_k$, phase rotation amount $\varphi_k$, and the like) used in the non-linear optical compensation unit 23 in all the steps. In the first embodiment, for example, the coefficient update unit 27 updates all the coefficients (for example, dispersion coefficient Ok, phase rotation amount $\varphi_k$, and the like) used in the non-linear optical compensation unit 23 in all the steps on the basis of output signals from the carrier phase noise compensation unit 26 and a training signal. The coefficient update unit 27 sets the updated coefficients in each functional unit of the non-linear optical compensation unit 23. The training signal to be compared with the output signals in the first embodiment is a transmission signal converted into an electrical signal.

The transmission characteristic estimation unit 28 estimates a transmission characteristic of the optical transmission path 3. For example, the transmission characteristic estimation unit 28 estimates loss distribution using an optimized phase rotation amount $\varphi_k$. The transmission characteristic estimation unit 28 supplies information indicating the estimated loss distribution to the network controller 6 as a DLM output. Note that the transmission characteristic estimation unit 28 may estimate dispersion distribution using an optimized dispersion coefficient $\beta_k$. In this case, the transmission characteristic estimation unit 28 supplies information indicating the dispersion distribution to the network controller 6 as a DLM output.

Next, returning to FIG. 2, a specific configuration of the network controller 6 will be described. The network controller 6 includes a simulation unit (simulator) 61, a storage unit (storage) 62, and an ideal output estimation unit (ideal output estimator) 63.

The simulation unit 61 constructs one or more simulation models for virtually reproducing a state (loss amount, loss position, distribution amount, etc.) of every optical transmission path 3 in the optical transmission system 100. The simulation unit 61 acquires one or more virtual DLM outputs and ideal outputs corresponding to the one or more respective virtual DLM outputs by the one or more constructed simulation models.

The storage unit 62 stores one or more first data sets obtained by associating the one or more virtual DLM outputs with the ideal outputs corresponding to the one or more respective virtual DLM outputs, obtained by the simulation unit 61. Furthermore, the storage unit 62 stores one or more second data sets obtained by associating one or more DLM outputs obtained in the real environment with ideal outputs corresponding to the one or more respective DLM outputs. The ideal outputs may be manually associated or may be automatically associated by the simulation unit 61. The storage unit 62 is formed using a storage device such as a magnetic storage device or a semiconductor storage device.

The ideal output estimation unit 63 includes a filter construction unit 631 and an ideal output unit 632. The filter construction unit 631 constructs a digital filter using the first data sets and the second data sets stored in the storage unit 62. The ideal output unit 632 estimates an output of a characteristic of an ideal device of the optical transmission system 100 on the basis of the digital filter constructed by the filter construction unit 631 and a DLM output obtained from the optical receiver 2.

Figure 5:
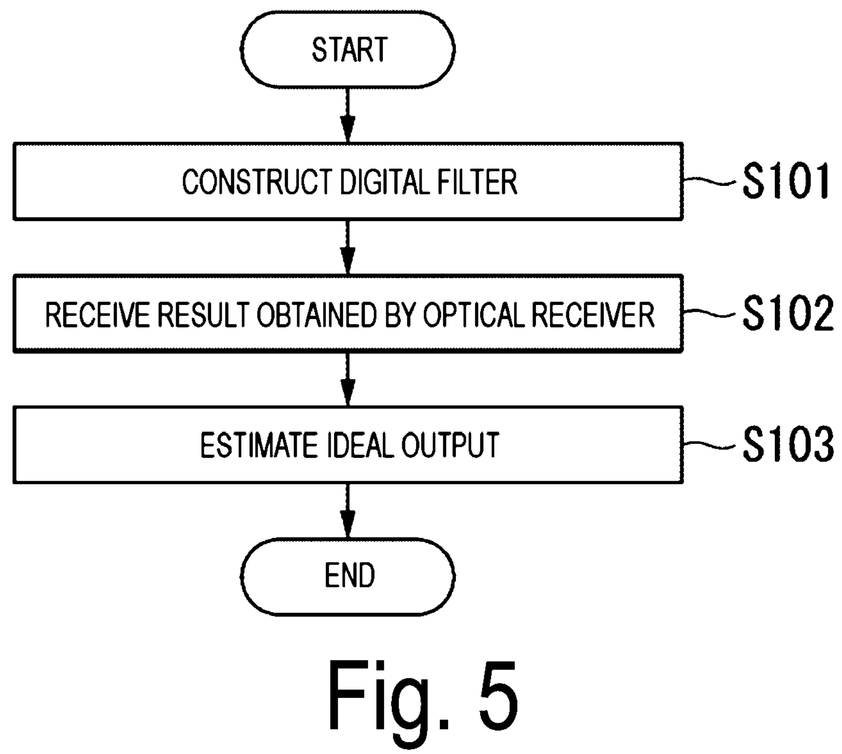
FIG. 5 is a flowchart illustrating a flow of processing of a network controller according to the first embodiment.

FIG. 5 is a flowchart illustrating a flow of processing of the network controller 6 according to the first embodiment. Note that simulation results obtained by the simulation unit 61 are assumed to be stored in the storage unit 62 at the start of the processing of FIG. 5.

The filter construction unit 631 constructs a digital filter using the first data sets and the second data sets stored in the storage unit 62 (step S101). Specifically, the filter construction unit 631 mixes the first data sets and the second data sets at any ratio, and constructs an optimal FIR filter h that minimizes a square error $\|y-Ah\lambda^2$, for example, on the basis of Formula (2) obtained by transforming following Formula (1).

[Math. 1]

$$y = \mathrm{Ah}\ y\text{: Ideal ouput} \begin{bmatrix} y_1 \\ \vdots \\ y_N \end{bmatrix} h\text{: } FIR \text{ filter}, \begin{bmatrix} h_1 \\ \vdots \\ h_K \end{bmatrix} A\text{: Circulant matrix of } DLM \text{ output} \quad \text{Formula (1)}$$

[Math. 2]

$$h = (A^T A)^{-1} A^T y \quad \text{Formula (2)}$$

Note that the digital filter used here is any digital filter. In the above example, the configuration in which a linear filter such as an FIR filter is constructed has been described, but a non-linear filter such as a Volterra filter or a neural network may be used. There is a possibility that use of a non-linear filter such as a Volterra filter or a neural network improves expressive power of a filter, and a highly accurate filter can be formed.

Note that a method of constructing the digital filter is also any method. An optimal filter using the least squares method as in the above example may be used, or a filter optimized using a gradient method may be used. An objective function other than the square error may be used in the gradient method. For example, any regularization term λR may be added to $A^T A$ in Formula (2). R is any matrix.

After the digital filter is constructed, the user of the optical transmission system 100 initiates communication between the optical transmitter 1 and the optical receiver 2. As a result, the optical receiver 2 can acquire a DLM output by performing digital signal processing on an optical signal transmitted from the optical transmitter 1. The optical receiver 2 outputs the acquired DLM output to the network controller 6. The ideal output unit 632 of the network controller 6 receives the DLM output obtained by the optical receiver 2 (step S102).

The ideal output unit 632 estimates an output of a characteristic of an ideal device by inputting the input DLM output to the digital filter constructed by the filter construction unit 631 (step S103). For example, in a case where the digital filter is a highly accurate filter, noise is removed from the input DLM output, and an output result in which the characteristic of the device appears more clearly can be obtained. The ideal output unit 632 outputs information of the estimated output of the characteristic of the ideal device to the outside.

The optical transmission system 100 formed as described above includes the simulation unit 61 that constructs a plurality of simulation models by virtually reproducing states of a plurality of optical transmission paths in the optical transmission system 100 including the optical transmitter 1, the optical receiver 2, and the optical transmission path 3 in different virtual spaces, and estimates a characteristic of a device provided in the optical transmission path 3 in each of simulation models, and an ideal output estimation unit 63 that estimates an output of a characteristic of an ideal device on the basis of a characteristic of the device estimated by the simulation unit 61 and a characteristic of a device provided in the optical transmission path 3 obtained in a real space. As a result, an output of a characteristic of an ideal device can be estimated on the basis of a state of every optical transmission path. Therefore, a characteristic of a device included in a transmission system can be estimated with high accuracy.

Furthermore, in the optical transmission system 100, a characteristic of every transmission path device is estimated by simulation by the simulation unit 61. Then, in the optical transmission system 100, an output of a characteristic of an ideal device is estimated by a digital filter being constructed using first data sets and second data sets, and an output of a characteristic of a device provided in an optical transmission path obtained in the real space being input to the constructed digital filter. As described above, in order to improve estimation accuracy of a characteristic of a device, a filter that accurately outputs a characteristic of every transmission path device needs to be formed, and actually preparing every optical transmission path and preparing an enormous amount of data sets of transmission path device characteristics are not realistic. On the other hand, in the present invention, since a characteristic of every transmission path device is estimated by simulation, more data sets can be prepared. As a result, a digital filter that accurately outputs a characteristic of a device can be constructed. Therefore, in the optical transmission system 100, a characteristic of a device included in the optical transmission system can be estimated with high accuracy using a constructed digital filter.

Second Embodiment

In a second embodiment, a maximum likelihood estimation method is used as a method for improving estimation accuracy of a characteristic of a device included in an optical transmission system.

Figure 6:
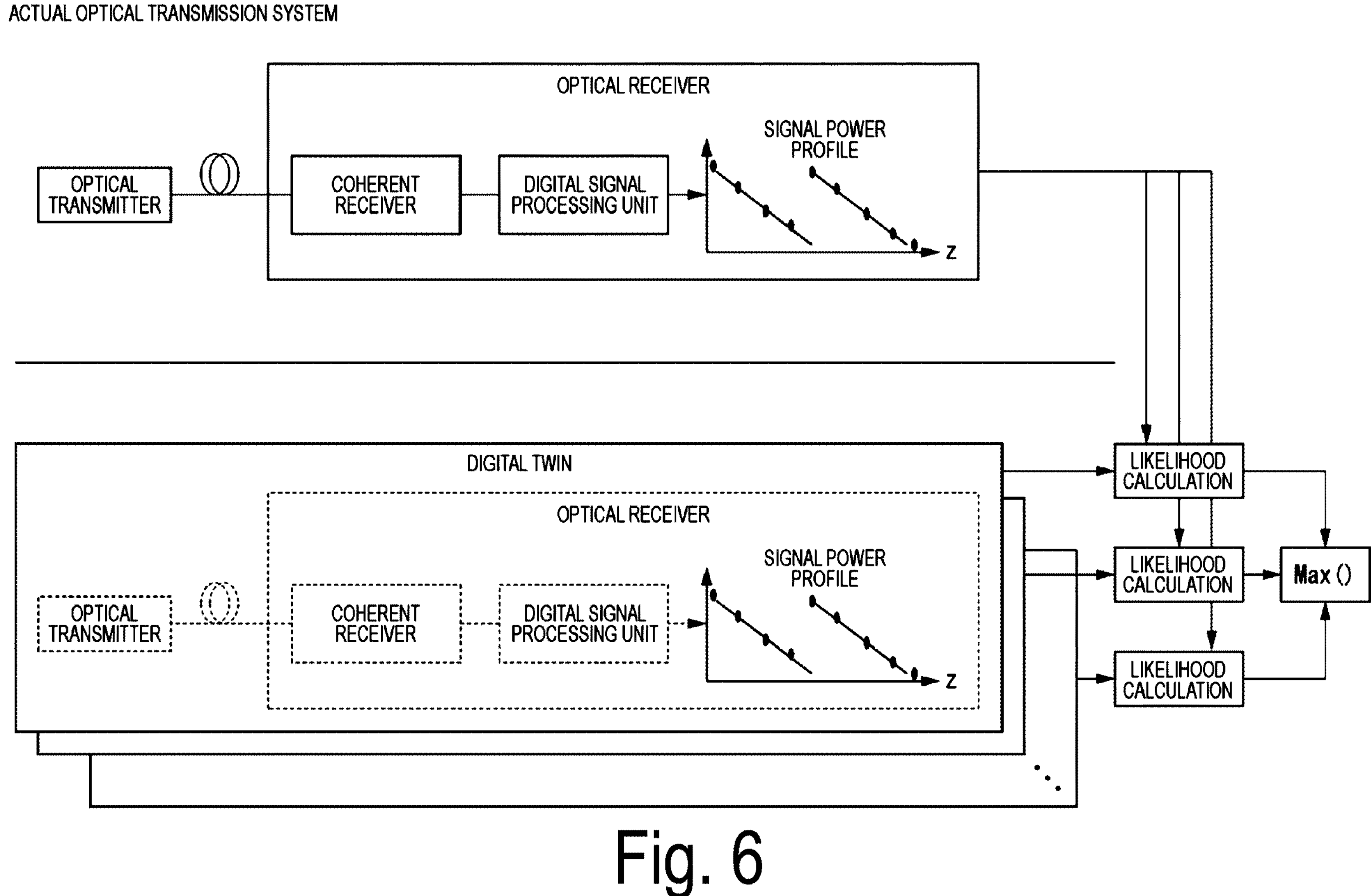
FIG. 6 is a diagram for describing an outline of an optical transmission system according to a second embodiment.

FIG. 6 is a diagram for describing an outline of an optical transmission system according to the second embodiment. Also in the second embodiment, similarly to the first embodiment, a state (loss amount, loss position, distribution amount, etc.) of every optical transmission path are virtually reproduced on digital twins, DLM outputs are obtained, and a plurality of data sets of the DLM outputs and ideal outputs is held. Then, a network controller calculates likelihoods of the plurality of held DLM outputs and an actually obtained DLM output, and identifies a DLM output that gives the maximum likelihood. The state (ideal output) of an optical transmission path that has output the identified DLM output is the desired state of a transmission path. Hereinafter, a specific configuration will be described.

Figure 7:
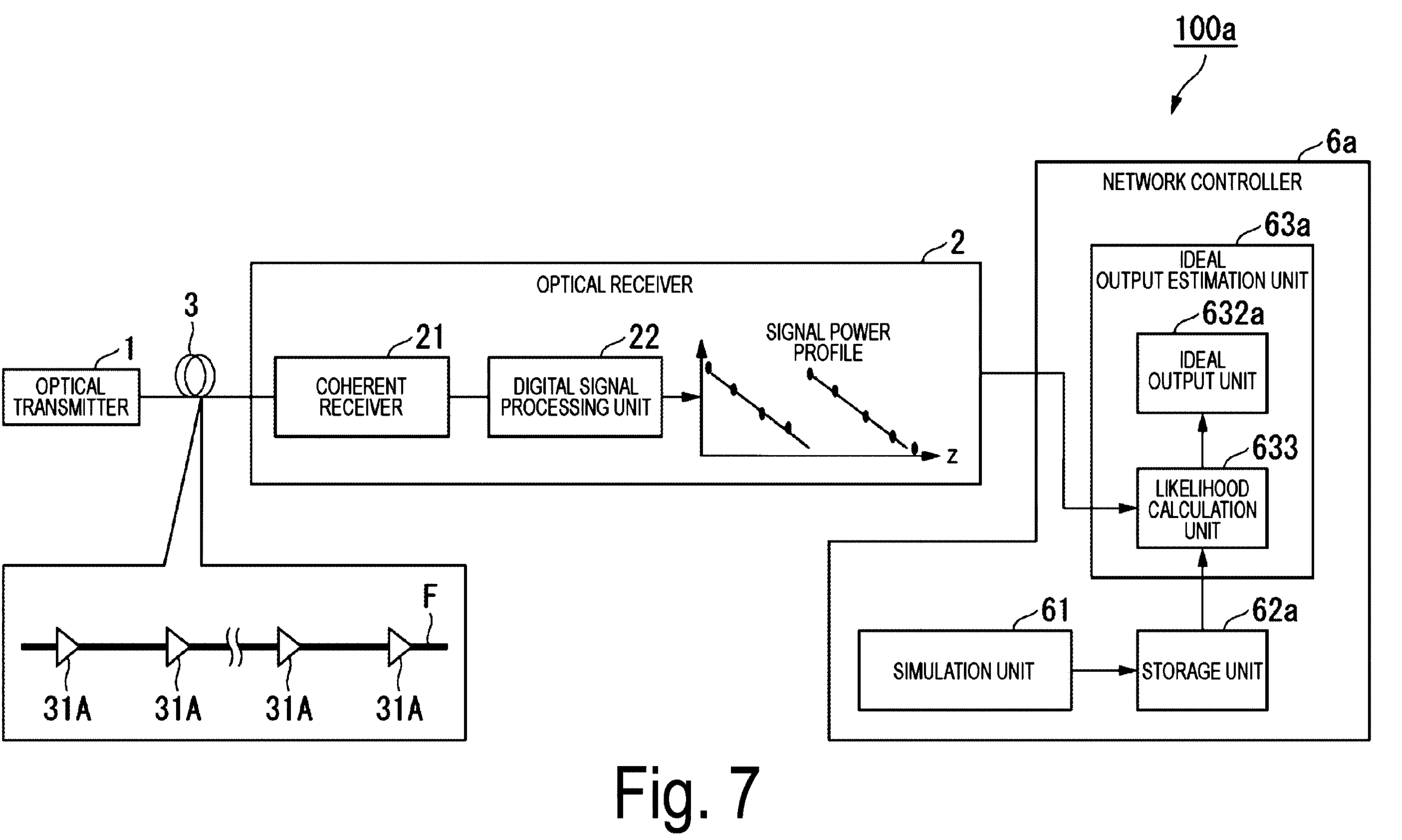
FIG. 7 is a diagram illustrating a configuration of the optical transmission system according to the second embodiment.

FIG. 7 is a diagram illustrating a configuration of an optical transmission system 100*a* according to the second embodiment. The optical transmission system 100*a* includes an optical transmitter 1, an optical receiver 2, an optical transmission path 3, and a network controller 6*a*. The optical transmission system 100*a* is similar to the optical transmission system 100 except for the configuration of the network controller 6*a*. Therefore, differences from the first embodiment will be described.

The network controller 6*a* includes a simulation unit 61, a storage unit 62*a*, and an ideal output estimation unit 63*a*.

The storage unit 62*a* stores one or more virtual DLM outputs and ideal outputs corresponding to the one or more respective virtual DLM outputs, obtained by the simulation unit 61. The storage unit 62*a* is formed using a storage device such as a magnetic storage device or a semiconductor storage device.

The ideal output estimation unit 63*a* includes a likelihood calculation unit 633 and an ideal output unit 632*a*. The likelihood calculation unit 633 calculates a likelihood of each of one or more virtual DLM outputs and a DLM output obtained from the optical receiver 2. The ideal output unit 632*a* identifies a virtual DLM output that gives the maximum likelihood among a plurality of likelihoods calculated by the likelihood calculation unit 633. The ideal output unit 632*a* estimates a state (ideal output) of an optical transmission path corresponding to the identified virtual DLM output as an output of a characteristic of an ideal device of the optical transmission system 100*a*.

Figure 8:
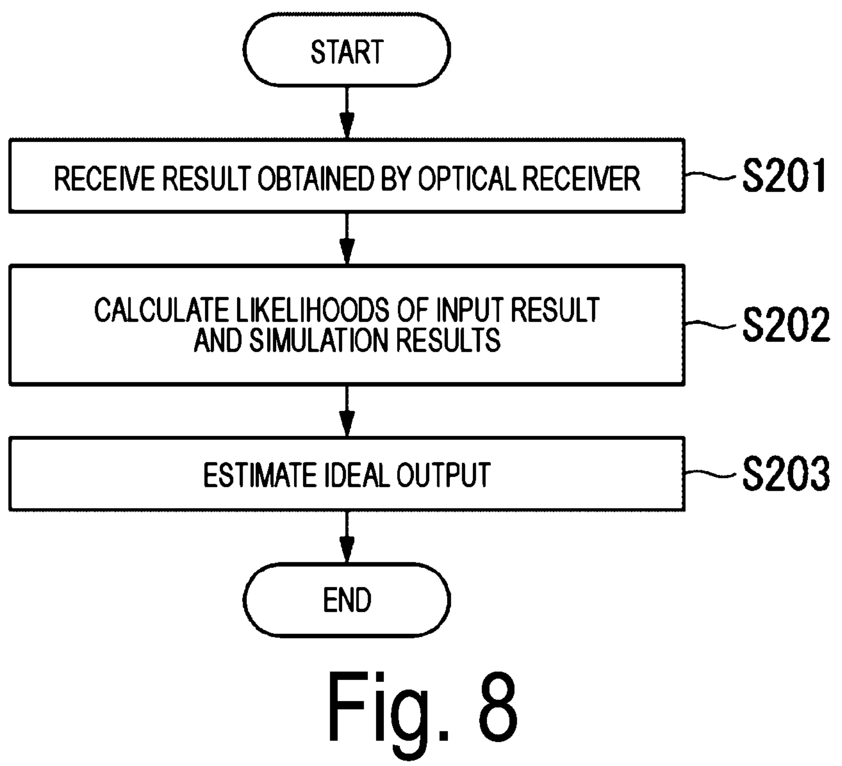
FIG. 8 is a flowchart illustrating a flow of processing of a network controller according to the second embodiment.

FIG. 8 is a flowchart illustrating a flow of processing of the network controller 6*a* according to the second embodiment. Note that simulation results obtained by the simulation unit 61 are assumed to be stored in the storage unit 62*a* at the start of the processing of FIG. 8.

The likelihood calculation unit 633 receives a DLM output obtained by the optical receiver 2 (step S201). The likelihood calculation unit 633 calculates likelihoods of the input DLM output and the virtual DLM outputs stored in the storage unit 62*a* (step S202). For example, the likelihood calculation unit 633 may calculate likelihoods of the input DLM output and the virtual DLM outputs stored in the storage unit 62*a* on the basis of following Formula (3).

[Math. 3]

$$E=-\|a-a'\|^2 \qquad \text{Formula (3)}$$

In Formula (3), a represents a DLM output, and a' represents a virtual DLM output. Note that the calculation method is not limited to the square error (negative sign) indicated in Formula (3), and the likelihood calculation unit 633 may calculate likelihoods by another method.

The likelihood calculation unit 633 outputs information of the calculated likelihoods to the ideal output unit 632*a*. The ideal output unit 632*a* identifies a virtual DLM output that gives the maximum likelihood among the information of the likelihoods output by the likelihood calculation unit 633. The ideal output unit 632*a* estimates a state of an optical transmission path corresponding to the identified virtual DLM output as an output of a characteristic of an ideal device of the optical transmission system 100*a* (step S203). The ideal output unit 632*a* outputs information of the estimated output of the characteristic of the ideal device to the outside.

In the optical transmission system 100*a* formed as described above, first, likelihoods of characteristics of devices estimated by the simulation unit 61 and a characteristic of a device provided in an optical transmission path obtained in the real space are calculated. Then, in the optical transmission system 100*a*, a virtual DLM output that gives the maximum likelihood is identified among a plurality of calculated likelihoods. Then, in the optical transmission system 100*a*, a state (ideal output) of an optical transmission path corresponding to the identified virtual DLM output is estimated as an output of a characteristic of an ideal device of the optical transmission system 100*a*. In this manner, the state of an optical transmission path close to a DLM output obtained in the real space can be estimated. Therefore, a characteristic of a device included in a transmission system can be estimated with high accuracy.

Modification Common to First Embodiment and Second Embodiment

In the configuration described above, the configuration in which calculation of a DLM output is performed by the optical receiver 2 has been described, but the configuration may be such that calculation of a DLM output is performed by the network controller 6,6*a*. In such a configuration, the function of the digital signal processing unit 22 of the optical receiver 2 is implemented in the network controller 6,6*a*.

Figure 9:
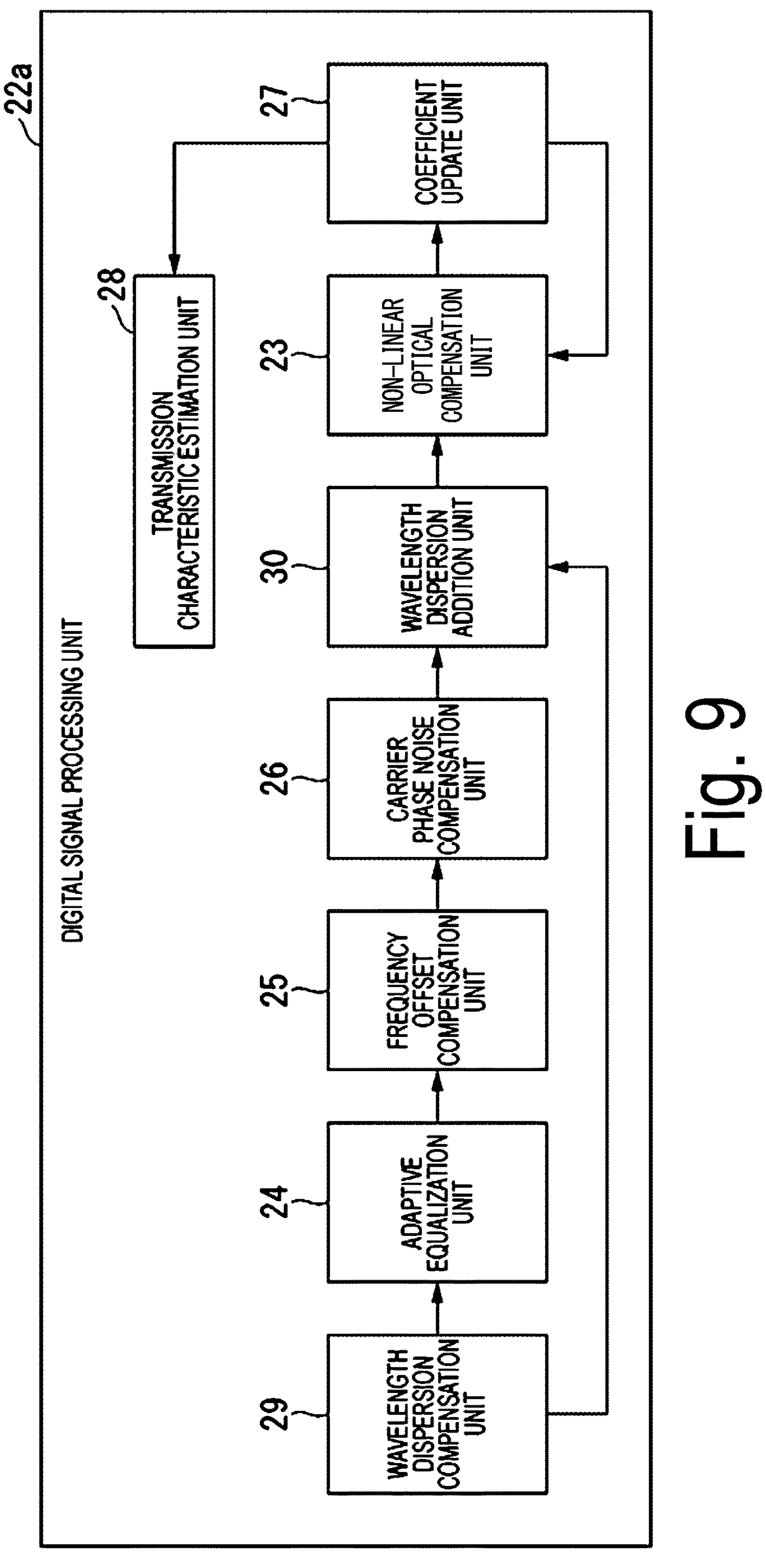
FIG. 9 is a diagram illustrating another example of a functional configuration of a digital signal processing unit.

In each embodiment, the configuration for obtaining a DLM output is not necessarily limited to the configuration of the digital signal processing unit 22 described above. The digital signal processing unit 22 may have another configuration as long as it can obtain a DLM output. FIG. 9 is a diagram illustrating another example of a functional configuration of a digital signal processing unit 22*a*. The digital signal processing unit 22*a* includes a wavelength dispersion compensation unit 29, the adaptive equalization unit 24, the frequency offset compensation unit 25, the carrier phase noise compensation unit 26, a wavelength dispersion addition unit 30, the non-linear optical compensation unit 23, the coefficient update unit 27, and the transmission characteristic estimation unit 28. The digital signal processing unit 22*a* further includes the wavelength dispersion compensation unit 29 and the wavelength dispersion addition unit 30 in the configuration of the digital signal processing unit 22.

The functions of the adaptive equalization unit 24, the frequency offset compensation unit 25, the carrier phase noise compensation unit 26, the non-linear optical compensation unit 23, the coefficient update unit 27, and the transmission characteristic estimation unit 28 are the same as those in FIG. 3, and thus, description thereof is omitted. The wavelength dispersion compensation unit 29 compensates for distortion due to wavelength dispersion generated in the optical transmission path 3. Specifically, the wavelength dispersion compensation unit 29 performs wavelength dispersion compensation by multiplying a reception signal in the frequency domain by a predetermined value (for example, $\exp\hat{}(-j\beta_k\omega^2)$). The wavelength dispersion addition unit 30 is a functional unit that adds the wavelength dispersion compensated by the wavelength dispersion compensation unit 29 to the signal again. Specifically, the wavelength dispersion addition unit 30 adds wavelength dispersion by multiplying the reception signal in the frequency domain by the reciprocal of the value used for multiplying by the wavelength dispersion compensation unit 29 (for example, exp^(+j$\beta_k\omega^2$)).

Some or all of the functions of the optical transmitter 1, the optical receiver 2, and the network controller 6,6*a* described above may be implemented by a computer. In that case, a program for implementing this function may be recorded in a computer-readable recording medium, and the program recorded in the recording medium may be read and executed by a computer system to implement the function. Note that the "computer system" mentioned herein includes an OS and hardware such as peripheral devices. The "computer-readable recording medium" refers to a portable medium such as a flexible disk, a magneto-optical disc, a ROM, or a CD-ROM, or a storage device such as a hard disk included in the computer system.

The "computer-readable recording medium" may include a medium that dynamically stores the program for a short time, such as a communication line in a case where the program is transmitted via a network such as the Internet or a communication line such as a telephone line, and a medium that stores the program for a certain period of time, such as a volatile memory inside the computer system serving as a server or a client in that case. Also, the program may be for implementing a part of the function described above, may be implemented in a combination of the function described above and a program already recorded in the computer system, or may be implemented with a programmable logic device such as a field programmable gate array (FPGA).

Although the embodiments of the present invention have been described in detail with reference to the drawings, specific configurations are not limited to the embodiments, and include design and the like within the scope of the present invention without departing from the gist of the present invention.

INDUSTRIAL APPLICABILITY

The present invention can be applied to a technology for estimating a characteristic of a device included in an optical transmission system.

REFERENCE SIGNS LIST

100, 100*a* Optical transmission system
1 Optical transmitter
2 Optical receiver
21 Coherent receiver
22 Digital signal processing unit
23 Non-linear optical compensation unit
231 Linear compensation unit
232 Non-linear compensation unit
233 Fourier transform unit
234 Wavelength dispersion compensation unit
235 Inverse Fourier transform unit
24 Adaptive equalization unit
25 Frequency offset compensation unit
26 Carrier phase noise compensation unit
27 Coefficient update unit
28 Transmission characteristic estimation unit
29 Wavelength dispersion compensation unit 29
30 Wavelength dispersion addition unit
3 Optical transmission path
31A Relay node
6, 6*a* Network controller
61 Simulation unit
62, 62*a* Storage unit
63, 63*a* Ideal output estimation unit
631 Filter construction unit
632, 632*a* Ideal output unit
633 Likelihood calculation unit

The invention claimed is:

1. A network controller included in an optical transmission system in which an optical transmitter and an optical receiver are configured to communicate with each other via an optical transmission path, the network controller comprising:

a simulator, including one or more processors, configured to construct a plurality of simulation models by virtually reproducing a state of an optical transmission path in an optical transmission system including the optical transmitter, the optical receiver, and the optical transmission path in different virtual spaces, and to estimate a characteristic of a device provided in the optical transmission path in each of simulation models, the different virtual spaces being spaces in which at least the amount and position of abnormal loss in the optical transmission path differ; and an ideal output estimator, including one or more processors, configured to estimate an output of a characteristic of an ideal device on a basis of a characteristic of the device estimated by the simulator and a characteristic of a device provided in the optical transmission path obtained in a real space by applying Digital Longitudinal Monitoring (DLM) to a received signal received by the optical receiver, wherein a state of an optical transmission path in the optical transmission system is different for each of the simulation models, wherein the ideal output estimator is configured to calculate a likelihood of each characteristic of the device estimated by the simulator and a characteristic of a device provided in the optical transmission path obtained in the real space, and to estimate a characteristic of a device having a highest calculated likelihood, estimated by the simulator, as a characteristic of the ideal device, or wherein the network controller further comprises a storage device configured to store one or more first data sets associating a characteristic of the device estimated by the simulator with an ideal output representing a characteristic of an ideal device, and one or more second data sets in which a characteristic of the device acquired in advance in the real space is associated with an ideal output representing a characteristic of an ideal device, and wherein the ideal output estimator is configured to estimate a characteristic of the ideal device by constructing a digital filter using the one or more first data sets and the one or more second data sets, and inputting a characteristic of a device provided in the optical transmission path obtained in the real space to the constructed digital filter.

2. The network controller according to claim 1, further comprising a digital signal processor, including one or more processors, configured to estimate a characteristic of a device provided in the optical transmission path on a basis of an output of the optical receiver that has received an optical signal transmitted from the optical transmitter.

3. An estimation method performed by a network controller included in an optical transmission system in which an optical transmitter and an optical receiver communicate with each other via an optical transmission path, the estimation method comprising:

constructing a plurality of simulation models by virtually reproducing a state of an optical transmission path in an optical transmission system including the optical transmitter, the optical receiver, and the optical transmission path in different virtual spaces, and estimating a characteristic of a device provided in the optical transmission path in each of simulation models, the different virtual spaces being spaces in which at least the amount and position of abnormal loss in the optical transmission path differ; and estimating an output of a characteristic of an ideal device on a basis of an estimated characteristic of the device and a characteristic of a device provided in the optical transmission path obtained in a real space by applying Digital Longitudinal Monitoring (DLM) to a received signal received by the optical receiver, wherein a state of an optical transmission path in the optical transmission system is different for each of the simulation models, wherein the estimation method further comprises calculating a likelihood of each characteristic of the device and a characteristic of a device provided in the optical transmission path obtained in the real space, and estimating a characteristic of a device having a highest calculated likelihood as a characteristic of the ideal device, or wherein the estimation method further comprises storing one or more first data sets associating an estimated characteristic of the device with an ideal output representing a characteristic of an ideal device, and one or more second data sets in which a characteristic of the device acquired in advance in the real space is associated with an ideal output representing a characteristic of an ideal device, and wherein the estimating a characteristic of the ideal device is performed by constructing a digital filter using the one or more first data sets and the one or more second data sets, and inputting a characteristic of a device provided in the optical transmission path obtained in the real space to the constructed digital filter.

4. A non-transitory computer readable storage medium that stores a computer program to be executed by a computer to function as a network controller included in an optical transmission system in which an optical transmitter and an optical receiver communicate with each other via an optical transmission path;

constructing a plurality of simulation models by virtually reproducing a state of an optical transmission path in an optical transmission system including the optical transmitter, the optical receiver, and the optical transmission path in different virtual spaces, and estimating a characteristic of a device provided in the optical transmission path in each of simulation models, the different virtual spaces being spaces in which at least the amount and position of abnormal loss in the optical transmission path differ; and estimating an output of a characteristic of an ideal device on a basis of an estimated characteristic of the device and a characteristic of a device provided in the optical transmission path obtained in a real space by applying Digital Longitudinal Monitoring (DLM) to a received signal received by the optical receiver, wherein a state of an optical transmission path in the optical transmission system is different for each of the simulation models, wherein the computer program further configures the computer to calculate a likelihood of each characteristic of the device and a characteristic of a device provided in the optical transmission path obtained in the real space, and to estimate a characteristic of a device having a highest calculated likelihood as a characteristic of the ideal device, or wherein the computer program further configures the computer to store one or more first data sets associating a characteristic of the device estimated with an ideal output representing a characteristic of an ideal device, and one or more second data sets in which a characteristic of the device acquired in advance in the real space is associated with an ideal output representing a characteristic of an ideal device, and wherein the estimating a characteristic of the ideal device is performed by constructing a digital filter using the one or more first data sets and the one or more second data sets, and inputting a characteristic of a device provided in the optical transmission path obtained in the real space to the constructed digital filter.

* * * * *